United States Patent
Zhou et al.

(10) Patent No.: US 9,291,781 B1
(45) Date of Patent: Mar. 22, 2016

(54) MT FERRULE ADAPTER FOR FITTING MT FERRULE ASSEMBLY INTO MPO CONNECTOR RECEPTACLE

(71) Applicant: LIGHTEL TECHNOLOGIES, INC., Renton, WA (US)

(72) Inventors: Ge Zhou, Renton, WA (US); Shangyuan Huang, Seattle, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 14/817,173

(22) Filed: Aug. 3, 2015

(51) Int. Cl.
- *G02B 6/36* (2006.01)
- *G02B 6/38* (2006.01)
- *G02B 6/40* (2006.01)

(52) U.S. Cl.
CPC .............. *G02B 6/385* (2013.01); *G02B 6/3825* (2013.01); *G02B 6/3898* (2013.01); *G02B 6/403* (2013.01)

(58) Field of Classification Search
None
See application file for complete search history.

(56) References Cited

U.S. PATENT DOCUMENTS

| | | | |
|---|---|---|---|
| 6,632,023 B1 * | 10/2003 | Ogawa et al. | G02B 6/3825 385/53 |
| 8,988,670 B2 | 3/2015 | Zhou et al. | |
| 2004/0218885 A1 * | 11/2004 | Segroves et al. | B25B 7/12 385/134 |
| 2014/0063598 A1 | 3/2014 | Zhou et al. | |

* cited by examiner

*Primary Examiner* — Mike Stahl
(74) *Attorney, Agent, or Firm* — Pai Patent & Trademark Law Firm; Chao-Chang David Pai

(57) ABSTRACT

The MT ferrule adapter for adapting an MT ferrule assembly into an MPO connector-type structure for endface inspection includes an upper jaw and a lower jaw rotatable relative to each other between an open position and a closed position. In the open position, the MT ferrule of the MT ferrule assembly can pass through the rear end of the MT ferrule adapter to be received in upper recesses of the lower jaw. In the closed position, the MT ferrule is fixedly held between lower recesses of the upper jaw and the upper recesses of the lower jaw with the front surface of the MT ferrule protruding out in front of the MT ferrule adapter. The MT ferrule adapter in the closed position has the same outer contour as MPO connectors so that the MT ferrule held in the MT ferrule adapter may be inspected by conventional MPO connector inspectors.

10 Claims, 9 Drawing Sheets

# MT FERRULE ADAPTER FOR FITTING MT FERRULE ASSEMBLY INTO MPO CONNECTOR RECEPTACLE

BACKGROUND OF THE INVENTION

1. Field of the Invention

The invention relates to inspection of optical fiber connectors and more particularly to an adapter for fitting an MT ferrule assembly into a standard MPO connector receptacle so that the MT ferrule assembly may be inspected by conventional connector inspectors for MPO connectors.

2. Description of the Related Art

Within an optical fiber connector, a ferrule is used to provide a mechanical entity for holding the fibers in a desired position. The fibers will be fixed in the precision holes on the ferrule. The ends of the fibers fixed in the holes will be polished together with the end of ferrule, in order that the fibers will be mated perfectly with another set of fibers. An MT ferrule is a ferrule with multi-holes to provide multi-fibers to be connected. The MT ferrule is an essential part of the MPO (Multi-fiber Push On) or MTP (Mechanical Transfer Push-on) connector and other industrial fiber connectors. Alternatively, an MT ferrule may also be mated directly with another MT ferrule.

The structure of an MT ferrule assembled with optical fibers (namely an "MT ferrule assembly") is shown in FIG. 1. As illustrated, an MT ferrule assembly 60 includes an MT ferrule 601 and a fiber array 602 wrapped in a protective cover 604. One end of the fiber array 602 is embedded in and extends through the MT ferrule 601 to be exposed on the front surface 614 of the MT ferrule 601. Thus, the endfaces 603 of the fibers in the fiber array 602 will be inspected from the front surface 614 of the MT ferrule 601. As an illustrative example, the fiber array 602 shown in FIG. 1 has two rows of fibers, each with 12 fibers. In actual practice, however, MT ferrules with one, two, four, or six rows of up to 12 fibers have been used. The MT ferrule 601 typically includes a front portion 610 and a rear portion 620. Both the front portion 610 and the rear portion 620 of the MT ferrule 601 have a rectangular cuboid shape. The front portion 610 has a relatively smaller cross section than the rear portion 620; more specifically, the rear portion 620 is wider and thicker than the front portion 610, and at the plane on which the front portion 610 meets the rear portion 620, the front portion 610 is symmetrically surrounded by the rear portion 620.

Before the MT ferrule assembly is further assembled into a standard MPO connector, or MT ferrule assembly is used as a stand-alone fiber connector, the ferrule endface (including the fiber endfaces) must be inspected to check if there are any defects, contamination, or even geometric inaccuracy. Any defects in the endface of the MT ferrule assembly have to be corrected beforehand. Otherwise, when the MT ferrule assembly 60 is directly mated with another MT ferrule assembly, the connection will not be satisfactory; if the MT ferrule assembly is embedded in an MPO connector housing, the MPO connector along with the embedded MT ferrule assembly has to be reworked or discarded. Therefore, it is important to inspect the MT ferrule assembly whether it is further assembled into an MPO connector or it is used alone.

Many apparatuses have been designed for inspecting optical fiber connectors. Two connector inspectors for inspecting MPO connectors are shown in FIG. 2 and FIG. 3.

FIG. 2 shows the alignment of an MPO connector 40 with an MPO connector adapter 30, an MPO inspector tip 20 (for 2-dimensional MPO connectors) and a microscope probe 10 to illustrate how an MPO connector 40 is interfaced with and inspected by the microscope probe 10 in the prior art. The MPO inspector tip 20 is disclosed by Zhou et al in the U.S. Pub. 2014/0063598. For the present application, it suffices to mention that the MPO inspector tip 20 has a front end 210 for connecting to the MPO connector adapter 30 and a rear end 211 for connecting to the microscope probe 10. The MPO connector adapter 30 has a front receptacle 301 and a rear receptacle 302. The front receptacle 301 is configured for receiving and positioning the front end 410 of the MPO connector 40, and the rear receptacle 302 is configured for receiving and positioning the front end 210 of the MPO inspector tip 20. When the MPO connector 40 and the MPO inspector tip 20 are both connected to the MPO connector adapter 30, and the rear end 211 of the MPO inspector tip 20 is connected to the microscope probe 10, the endface 414 of the MT ferrule embedded in the MPO connector 40 is properly positioned for inspection by the microscope probe 10.

Alternatively, an MPO connector may be inspected by an automated inspection system 50, such as the one disclosed by Zhou et al in the U.S. Pat. No. 8,988,670 and implemented with improvements as the LIGHTEL ARRAYVIEW system, as shown in FIG. 3. In brief, the automated inspection system 50 has an MPO connector holder 51 for holding an MPO connector receptacle 510 configured like the front receptacle 301 of the MPO connector adapter 30 (shown in FIG. 2). An inspecting microscope (not shown) is housed inside the automated inspection system 50 and the optical window 52 of the inspecting microscope is spaced from the MPO connector holder 51 for facilitating simultaneous cleaning of the endface 414 of the MPO connector 40 connected to the MPO connector receptacle 510.

It is economical to use an MPO connector's inspector to inspect MT ferrule assembly. However, the connector receptacle of conventional MPO connector inspectors such as the ones shown in FIG. 2 and FIG. 3 cannot fit with an MT ferrule assembly 60 directly.

It is the objective of the present invention to provide an adapter (namely, MT ferrule adapter) to quickly adapt the MT fiber assembly 60 into an MPO connector-type structure so that the MT fiber assembly 60 may be interfaced with a standard MPO connector adapter 30 or to an MPO connector receptacle 510 for endface inspection by conventional connector inspectors capable of inspecting MPO connectors.

BRIEF SUMMARY OF THE INVENTION

The MT ferrule adapter according to the present application for converting an MT ferrule assembly into an MPO connector-type structure for inspection comprises an upper jaw having a front portion and a rear portion; a lower jaw having a front portion and a rear portion; and a shaft passing through the rear portion of the upper jaw and the rear portion of the lower jaw, such that the upper jaw and the lower jaw are rotatable relative to each other about the shaft between an open position and a closed position.

The lower jaw and the upper jaw are designed to fixedly hold an MT ferrule assembly between the two. To that purpose, an elongated open channel is disposed on an upper side of the lower jaw; the open channel comprises a rear recess with an open rear end, a rectangular front recess with an open front end, and a rectangular middle recess between the front recess and the rear recess. To accommodate the different dimensions of the front portion and the rear portion of the MT ferrule, the middle recess is wider and deeper than the front recess.

Similarly, an elongated open channel is disposed on a lower side of the upper jaw; the open channel comprises a rear recess with an open rear end, a front recess with an open front end, and a middle recess between the front recess and the rear recess.

When the upper jaw and the lower jaw are in the open position, an opening is formed between the rear portion of the upper jaw and the rear portion of the lower jaw. The opening should be sufficiently large for an MT ferrule assembly to pass through in order for a lower portion of the front portion of the MT ferrule of the MT ferrule assembly to be set in the front recess of the lower jaw, a lower portion of the rear portion of the MT ferrule of the MT ferrule assembly to be set in the middle recess of the lower jaw.

On the other hand, when the upper jaw and the lower jaw are in the closed position, the front recess of the upper jaw and the front recess of the lower jaw together form a front locating space, the middle recess of the upper jaw and the middle recess of the lower jaw together form a middle locating space, and the rear recess of the upper jaw and the rear recess of the lower jaw together form a rear locating space. The front recess, the middle recess, or both of the upper jaw press down on the top surface of the MT ferrule. Thus, the front portion and the rear portion of the MT ferrule of the MT ferrule assembly are respectively fixedly held in the front locating space and the middle locating space, with the front surface of the MT ferrule protruding in front of the front locating space, and the fiber array (along with a protective cover) of the MT ferrule assembly extends past the rear locating space.

The front recess and the middle recess of the upper jaw are preferably rectangular so that both the front locating space and the middle location recess are each a cuboid space. In addition, the front locating space and the middle locating space preferably correspond to the outer contour (in terms of length and width) of the front portion and the rear portion of the MT ferrule, respectively.

Furthermore, a spring sheet may be disposed in the open channel of the upper jaw for holding down the MT ferrule of the MT ferrule assembly when the upper jaw and the lower jaw are in the closed position.

Furthermore, the MT ferrule adapter according to the present application may also have an outer contour features similar to a conventional MPO connector in order to properly interface with an MPO connector adapter, such as a polarity key, stop spaces, and projections.

BRIEF DESCRIPTION OF THE DRAWINGS

The MT ferrule adapter of the present invention will be described in detail in conjunction with the following drawings.

DETAILED DESCRIPTION OF THE INVENTION

The present invention will be described in detail below in view of the accompanying drawings.

Figure 1:
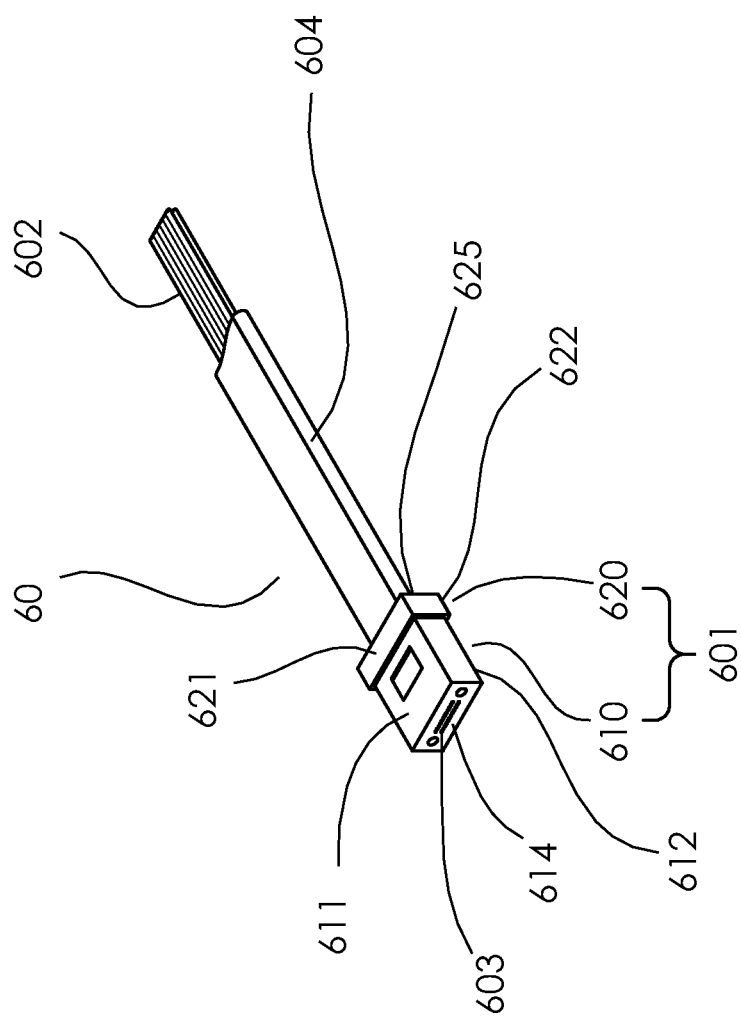
FIG. 1 shows a conventional MT ferrule assembly with a fiber array wrapped in a protective cover.
Figure 2:
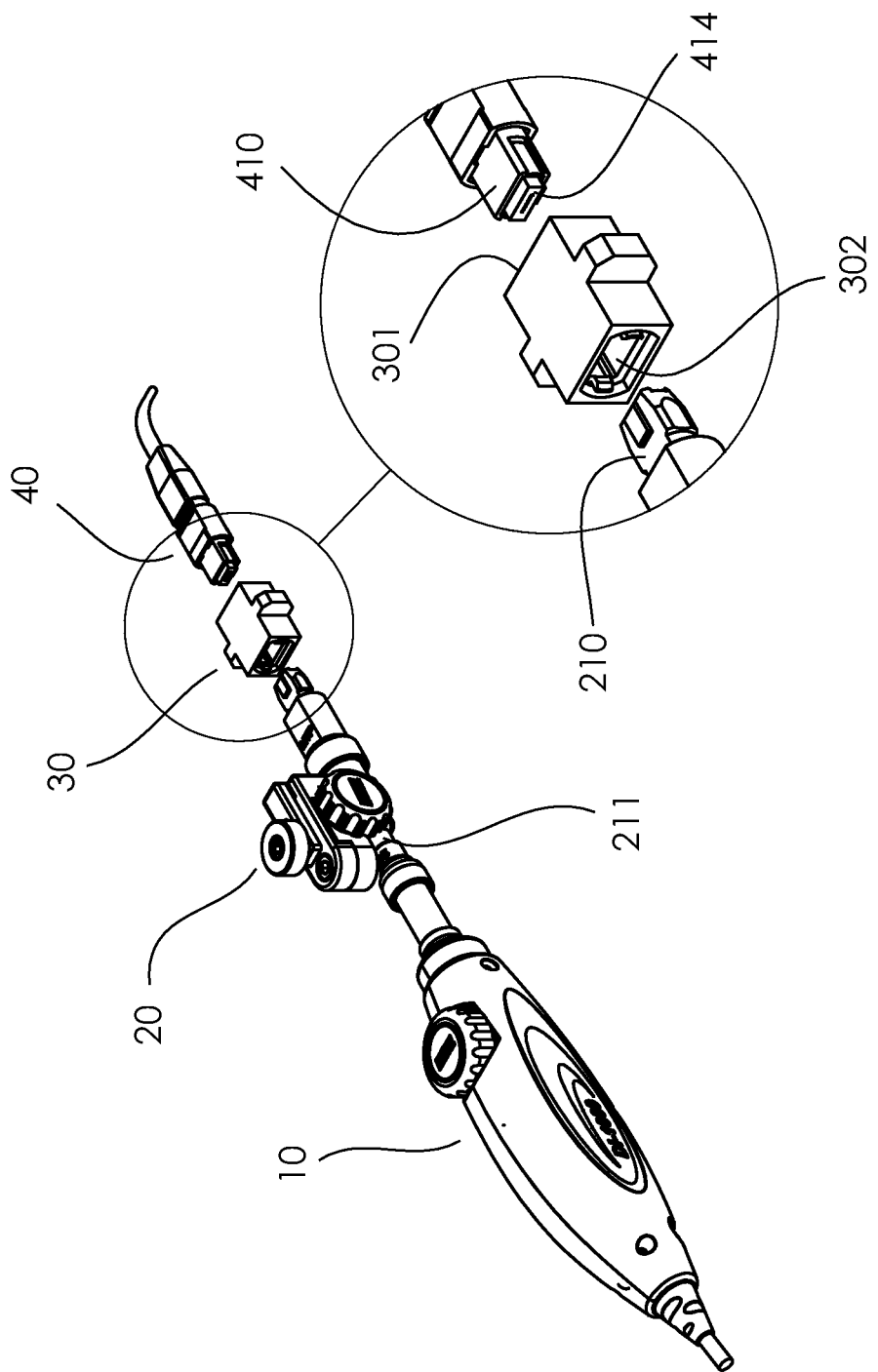
FIG. 2 shows the alignment of an MPO connector with an MPO connector adapter and a microscope probe to illustrate how an MPO connector is inspected by the microscope probe in the prior art.
Figure 3:
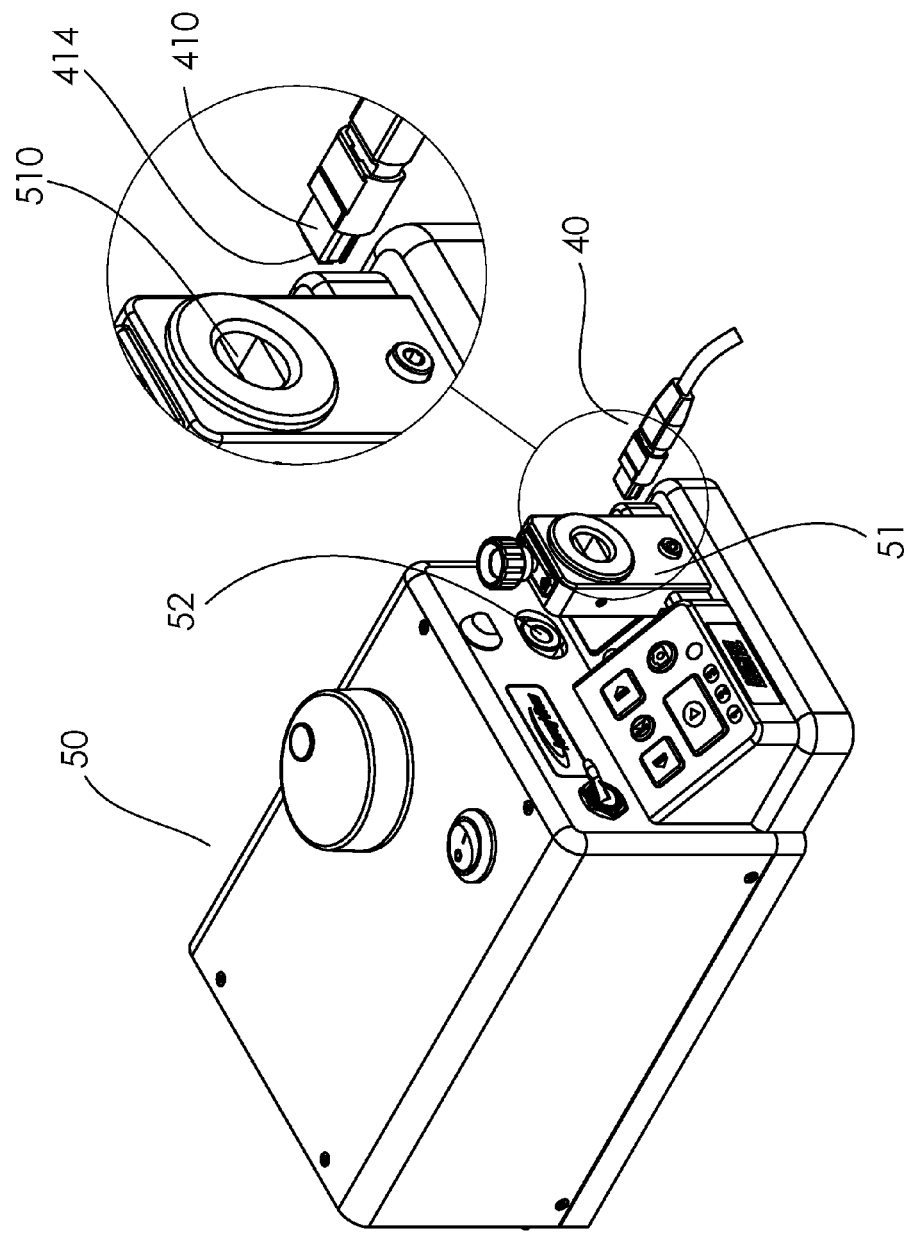
FIG. 3 shows the alignment of an MPO connector with an automated inspection system to illustrate how an MPO connector is inspected by the automated inspection system in the prior art.
Figure 4:
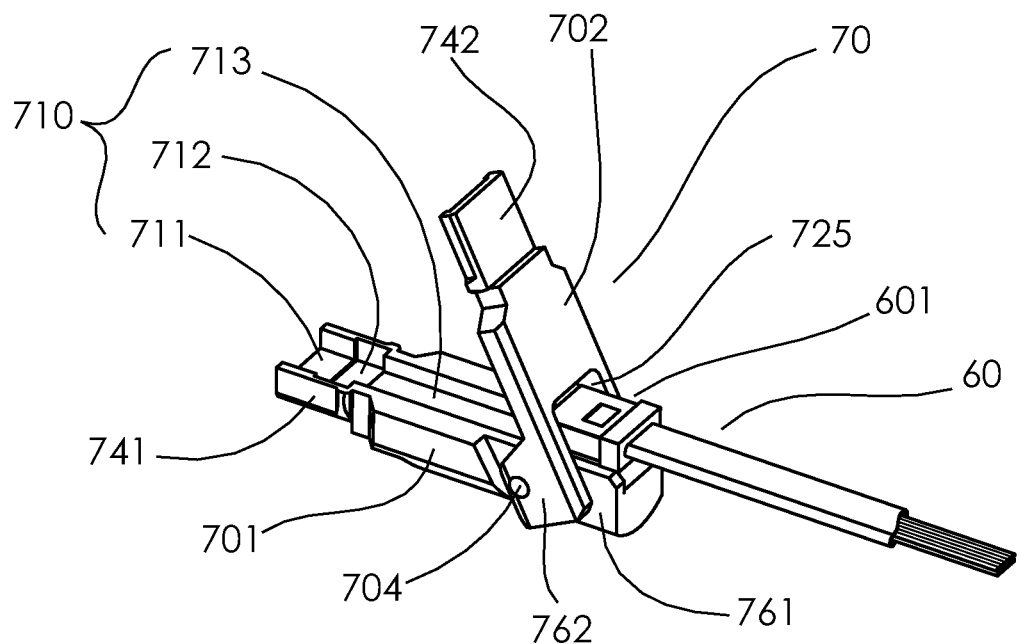
FIG. 4 is a rear perspective view of the MT ferrule adapter according to the present application with its upper jaw and lower jaw arranged in an open position for an MT ferrule assembly to be inserted therebetween.
Figure 5:
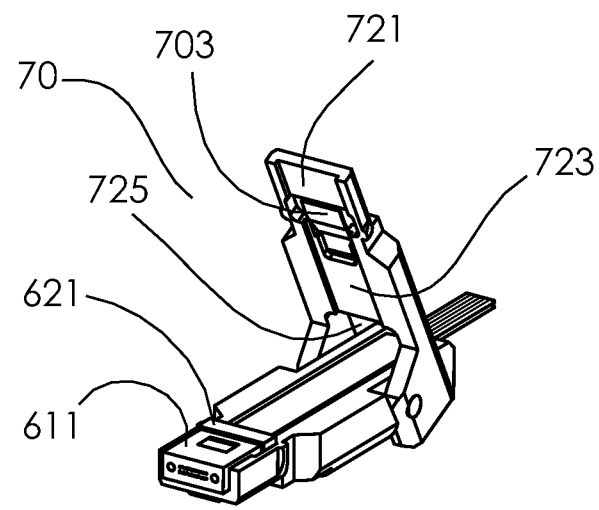
FIG. 5 is a front perspective view of the MT ferrule adapter shown in FIG. 4 with the MT ferrule assembly placed in position.

As illustrated in FIGS. 4 and 5, the MT ferrule adapter 70 according to a preferred embodiment of the present application comprises an upper jaw 702, a lower jaw 701 and a shaft 704 passing through a rear portion 762 of the upper jaw 702 and a rear portion 761 of the lower jaw 701 such that the upper jaw 702 and the lower jaw 701 are rotatable relative to each other about the shaft 704. The upper jaw 702 and the lower jaw 701 of the MT ferrule adapter 70 are arranged in an open position, wherein the front portion 742 of the upper jaw 702 and the front portion 741 of the lower jaw 701 are spaced from each other, forming an acute angle between the upper jaw 702 and the lower jaw 701, and an arch-like opening 725 is formed for an MT ferrule assembly 60 to pass through (as shown in FIG. 4) for the MT ferrule 601 to be received and snugly held in the lower jaw 701 (as shown in FIG. 5).

As shown in FIGS. 7-10, the upper jaw 702 and the lower jaw 701 of the MT ferrule adapter 70 are arranged in a closed position, wherein the front portion 742 of the upper jaw 702 is in contact with the front portion 741 of the lower jaw 701 with an MT ferrule assembly 60 held in between the upper jaw 702 and the lower jaw 701. The front surface 614 of the MT ferrule 601 of the MT ferrule assembly 60 protrudes out of an opening formed on the front end 75 (i.e. collectively the front end 751 of the lower jaw 701 and the front end 752 of the upper jaw 702) of the MT ferrule adapter 70. More precisely, the opening is formed between the front recess 711 of the lower jaw 701 and the front recess 721 of the upper jaw 702.

Figure 6:
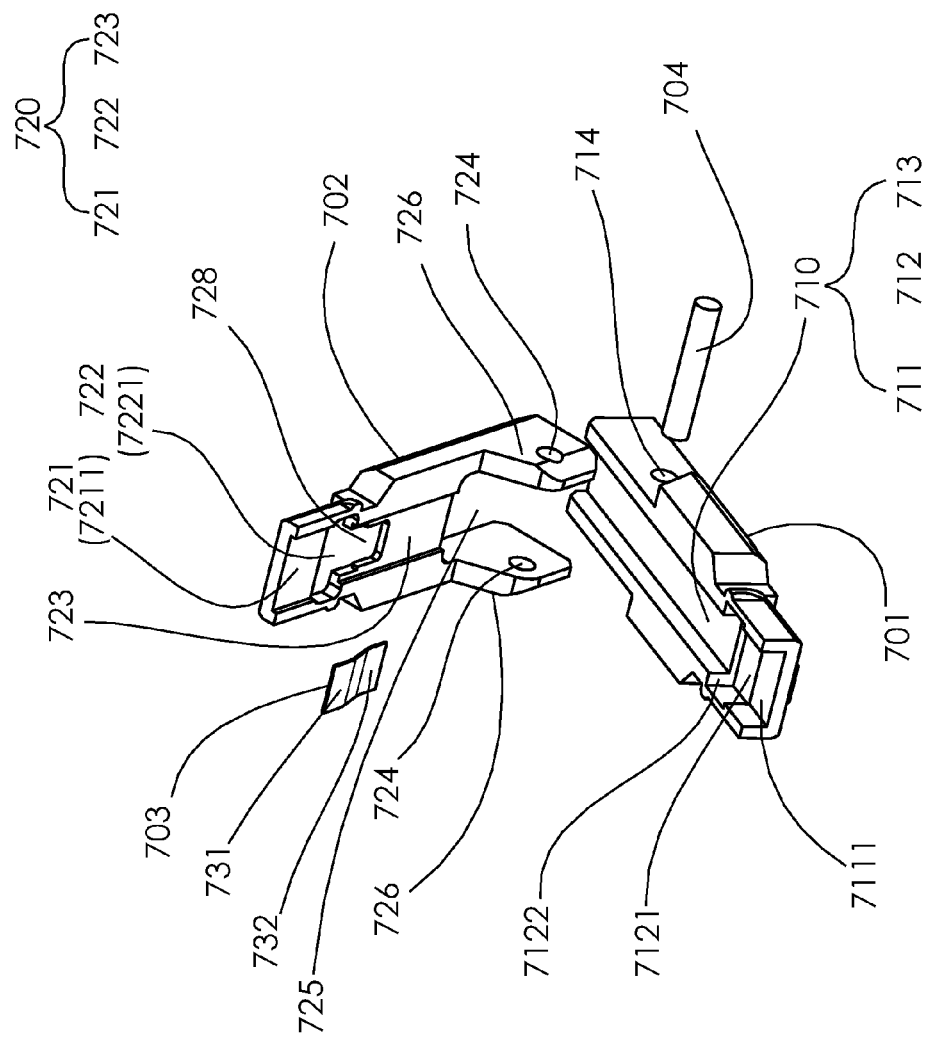
FIG. 6 shows an exploded view of the MT ferrule adapter according to the present application to illustrate its components and internal structure.

The exploded view of the MT ferrule adapter 70 in FIG. 6 illustrates its components and internal structure. First, an elongated open channel 710 is disposed on an upper side of the lower jaw 701. The open channel 710 comprises an elongated rectangular rear recess 713 with an open rear end, a rectangular front recess 711 with an open front end, and a rectangular middle recess 712 between the front recess 711 and the rear recess 713. The front recess 711 of the lower jaw 701 is designed to have a contour for snugly receiving a lower part of the front portion 610 of the MT ferrule 601 of an MT ferrule assembly 60, the middle recess 712 of the lower jaw 701 has a contour for conformally receiving a lower part of the rear portion 620 of the MT ferrule 601, and the rear recess 713 of the lower jaw 701 has a contour sufficiently wide for receiving a lower part of the protective cover 604 of the MT ferrule assembly 60. Essentially, the front recess 711 of the lower jaw 701 has a width the same as the width of the front portion 610 of the MT ferrule 601, the middle recess 712 of the lower jaw 701 has a width the same as the width of the rear portion 620 of the MT ferrule 601, however, the rear recess 713 of the lower jaw 701 need not be of the same width as the protective cover 604 of the MT ferrule assembly 60 as long as it is wider than the width of the protective cover 604 of the MT ferrule assembly 60. Correspondingly, the middle recess 712 is wider and deeper than the front recess 711 and the rear recess 713. In addition, when the MT ferrule 601 is received in the MT ferrule adapter 70 in the closed position, the bottom surface 612 of the front portion 610 and the bottom surface 622 of the rear portion 620 of the MT ferrule 601 are in contact with the bottom surface 7111 of the front recess 711 and the bottom surface 7121 of the middle recess 712 of the lower jaw 701, respectively. In addition, the middle recess 712 of the lower jaw 701 is of the same (longitudinal) length as (or slightly larger than) the rear portion 620 of the MT ferrule 601 so that the rear end surface 625 of the rear portion 620 is tightly held against the rear end surface 7122 of the middle recess 712.

Similarly, an elongated open channel 720 is disposed on the lower side of the upper jaw 702. The open channel 720 of the upper jaw 702 comprises an elongated rectangular rear recess 723 with an open rear end sufficiently wide for receiving an upper part of the protective cover 604 of the MT ferrule assembly 60, a rectangular front recess 721 with an open front end for receiving an upper part of the front portion 610 of the MT ferrule 601, and a rectangular middle recess 722 between the front recess 721 and the rear recess 723 for receiving an upper part of the rear portion 620 of the MT ferrule 601. Corresponding to the outer contour of the MT ferrule 601, the middle recess 722 of the upper jaw 702 is wider and deeper than the front recess 721 and the rear recess 723 in the preferred embodiment shown in FIG. 6, although that is not a requirement for the MT ferrule adapter 70 to work properly.

Therefore, when the upper jaw 702 and the lower jaw 701 are in the closed position, the front recess 721 of the upper jaw 702 and the front recess 711 of the lower jaw 701 together form a front locating space, the middle recess 722 of the upper jaw 702 and the middle recess 712 of the lower jaw 701 together form a middle locating space, and the rear recess 723 of the upper jaw 702 and the rear recess 713 of the lower jaw 701 together form a rear locating space. Thus, the front portion 610 and the rear portion 620 of the MT ferrule 601 of the MT ferrule assembly 60 are respectively fixedly held in the front locating space and the middle locating space, with the front surface 614 of the MT ferrule 601 protruding in front of the front locating space, and the protective cover 604 of the MT ferrule assembly 60 extends through the rear locating space.

When both the front recess 721 of the upper jaw 702 and the front recess 711 of the lower jaw 701 are rectangular in shape and of the same width and length, the front locating space is a cuboid space. Similarly, when both the middle recess 722 of the upper jaw 702 and the middle recess 712 of the lower jaw 701 are rectangular in shape and the same width and length, the middle locating space is a cuboid space.

For the MT ferrule adapter 70 to work properly with an MT ferrule assembly 60, it is sufficient for the lower part of the MT ferrule 601 of the MT ferrule assembly 60 to be conformally received in the front recess 711 and the middle recess 712 of the lower jaw 701, as discussed above, however, it is not necessary for the front recess 721 and the middle recess 722 of the upper jaw 702 to be of the same width as the front portion 610 and the rear portion 620 of the MT ferrule 601, respectively. Nevertheless, to help secure the MT ferrule 601 in position when the MT ferrule adapter 70 is in the closed position, the front recess 721 of the upper jaw 702 should be made to press downward against the top surface 611 of the front portion 610 of the MT ferrule 601; alternatively, the middle recess 722 of the upper jaw 702 should be made to press downward against the top surface 621 of the rear portion 620 of the MT ferrule 601. In other words, it is optional to have the top surface 611 of the front portion 610 and the top surface 621 of the rear portion 620 of the MT ferrule 601 in contact with the top surface 7211 of the front recess 721 and the top surface 7221 of the middle recess 722, respectively.

When the upper jaw 702 and the lower jaw 701 are arranged in the closed position, the front end 752 of the upper jaw 702 is flush with the front end 751 of the lower jaw 701.

Figure 10:
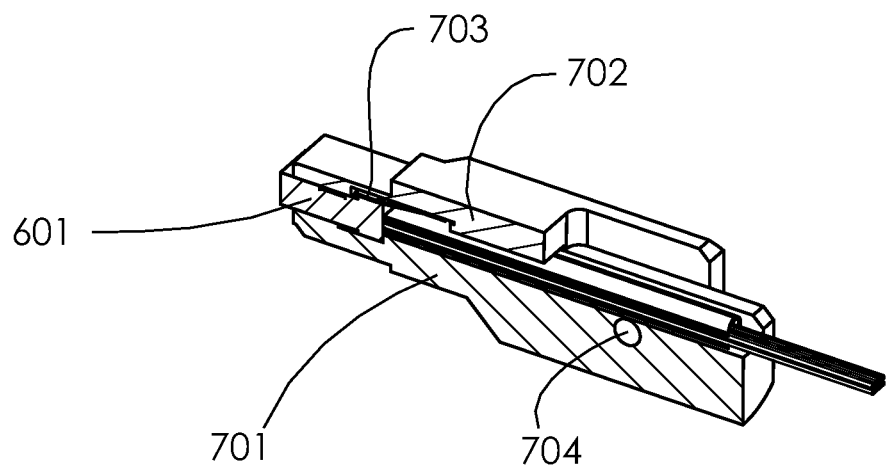
FIG. 10 is a cross-sectional view of the MT ferrule adapter cut along the line A-A in FIG. 9.

Additionally, as shown in FIG. 6, the middle recess 722 of the upper jaw 702 is deeper than the front recess 721, and an additional recess 728 extending rearward from the middle recess 722 is formed in the rear recess 723 for housing a spring sheet 703 for pressing down on the MT ferrule 601 when the upper jaw 702 and the lower jaw 701 are arranged in the closed position. In the embodiment shown, the spring sheet 703 has one end 732 fixed in the recess 728 and a free end 731 for flexibly pressing down on the top surface 621 of the rear portion 620 of the MT ferrule 601 received between the middle recess 722 of the upper jaw 702 and the middle recess 712 of the lower jaw 701, as shown in FIG. 10.

When the upper jaw 702 and the lower jaw 701 of the MT ferrule adapter 70 are arranged in the open position, as shown in FIGS. 4-5, an arch-like opening 725 is formed between the rear recess 723 of the upper jaw 702 and the rear recess 713 of the lower jaw 701. The arch-like opening 725 is sufficiently large for the MT ferrule assembly 60 to pass through to run over the upper side of the lower jaw 701 in order for a lower portion of the MT ferrule 601 of the MT ferrule assembly 60 to be conformally received and securely held in the front and middle recesses 711, 712 of the lower jaw 701. Moreover, as mentioned above, when the MT ferrule assembly 60 is placed in the front, middle and rear recesses 711, 712 and 713 of the lower jaw 701, the front surface 614 of the MT ferrule 601 protrudes in front of the front recess 711 of the lower jaw 701

In the embodiment of MT ferrule adapter shown in FIG. 6, the rear portion 762 of the upper jaw 702 includes two connecting legs 726 extending transversely from the rear end of the rear recess 723 and straddling the rear portion 761 of the lower jaw 701. Two mounting holes 724 are respectively formed on the two connecting legs 726. The shaft 704 passes through the two mounting holes 724 and a through hole 714 formed through the rear portion 761 of the lower jaw 701 to hold the upper jaw 702 and the lower jaw 701 together and allow the two to be rotatable relative to each other.

Figure 7:
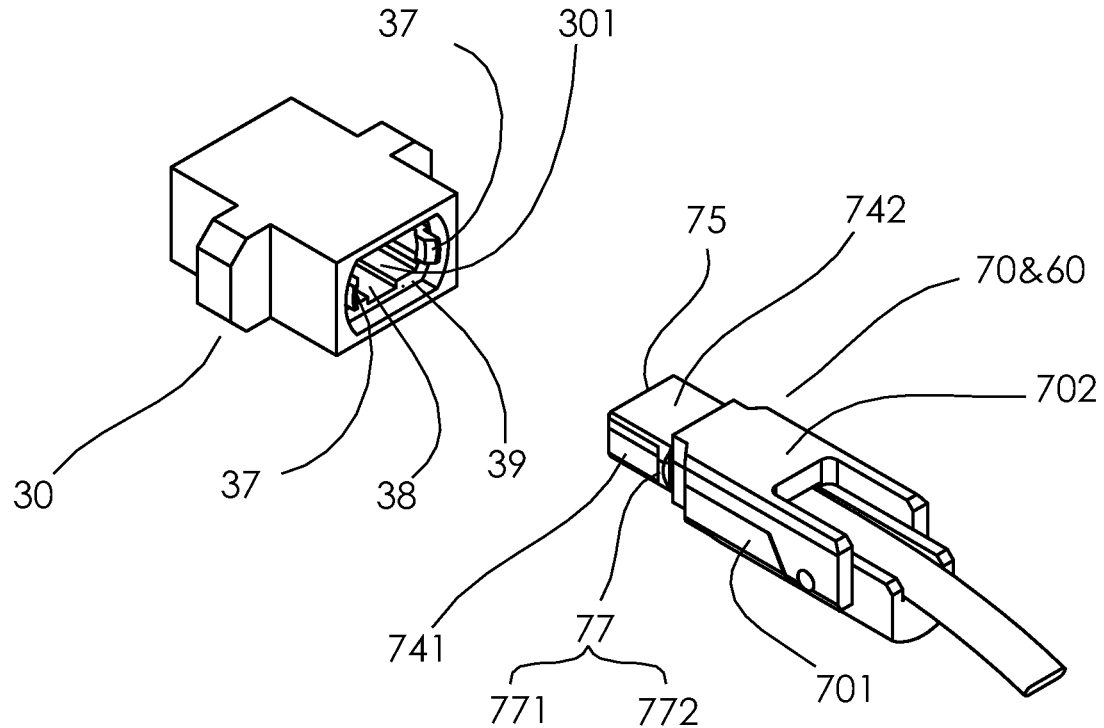
FIG. 7 is a rear top perspective view of the MT ferrule adapter according to the present application with its upper jaw and lower jaw arranged in the closed position holding the MT ferrule assembly and oriented to be readily inserted into an MPO connector adapter.
Figure 9:
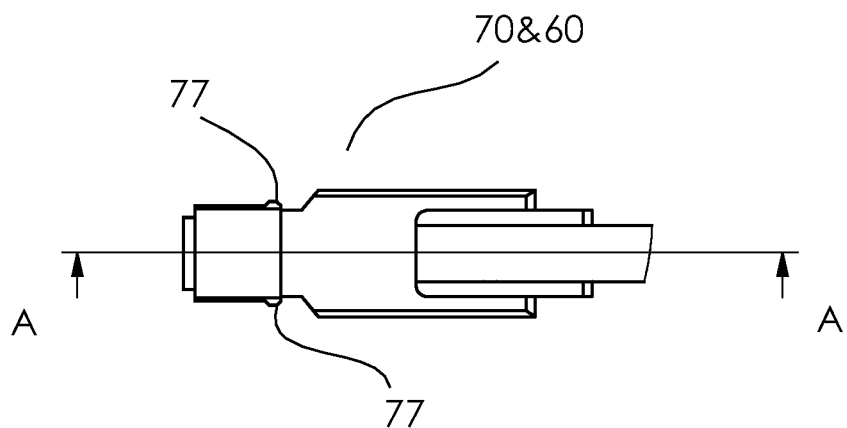
FIG. 9 is a top plan view of the MT ferrule adapter according to the present application with its upper jaw and lower jaw arranged in the closed position.

In order to precisely position the MT ferrule 601 of the MT ferrule assembly 60 in the front receptacle 301 of the MPO connector adapter 30, as shown in FIG. 7 and FIG. 9, a protrusion 772 is formed on each of two lateral surfaces of the upper jaw 702 at a distance from a front end 752 of the upper jaw 702, and a protrusion 771 is formed on each of two lateral surfaces of the lower jaw 701 at a distance from a front end 751 of the lower jaw 701. When the upper jaw 702 and the lower jaw 701 are arranged in the closed position, the protrusions 772 and the protrusions 771 come in contact to jointly form two protrusions 77 on the two lateral sides, respectively. Then, when the MT ferrule adapter 70 are in the closed position holding an MT ferrule assembly 60 in between is inserted into an MPO connector adapter 30, the protrusion 77 on each lateral side of the MT ferrule adapter 70 will engage with a respective hook 37 at the front receptacle 301 of the MPO connector adapter 30.

Figure 8:
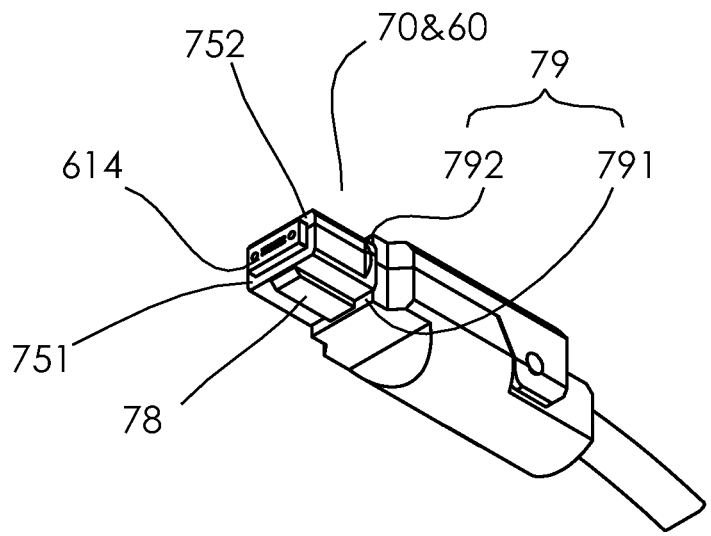
FIG. 8 is a front bottom perspective view of the MT ferrule adapter according to the present application with its upper jaw and lower jaw arranged in the closed position holding the MT ferrule assembly.

Furthermore, as shown in FIG. 8, a downward projecting longitudinal strip 78 is provided on a front middle part of the bottom side of the lower jaw 701. The longitudinal strip 78 will serve as a polarity key for mating with a corresponding bottom recess 38 internal to the front receptacle 301 of the MPO connector adapter 30.

Furthermore, as shown in FIG. 8, a front-facing surface 792 is formed on the outer perimeter of the upper jaw 702 at a distance from the front end 752 of the upper jaw 702, and a corresponding front-facing surface 791 is formed on an outer perimeter of the lower jaw 701 at a distance from the front end 751 of the lower jaw 701. The front-facing surface 791 is perpendicular to and may be connected with the longitudinal strip 78. When the MT ferrule adapter 70 is arranged in the closed position, the front-facing surface 792 and the front-facing surface 791 will form a flat front-facing surface 79. The flat front-facing surface 79 may be a jointed surface or a disjointed surface. Thus, when the MT ferrule adapter 70 in the closed position holding an MT ferrule assembly 60 between the upper jaw 702 and the lower jaw 701 is inserted into the front receptacle 301 of an MPO connector adapter 30, the front-facing surface 79 will stop at an end surface 39 of the front receptacle 301 of the MPO connector adapter 30 for proper connection.

Figure 11:
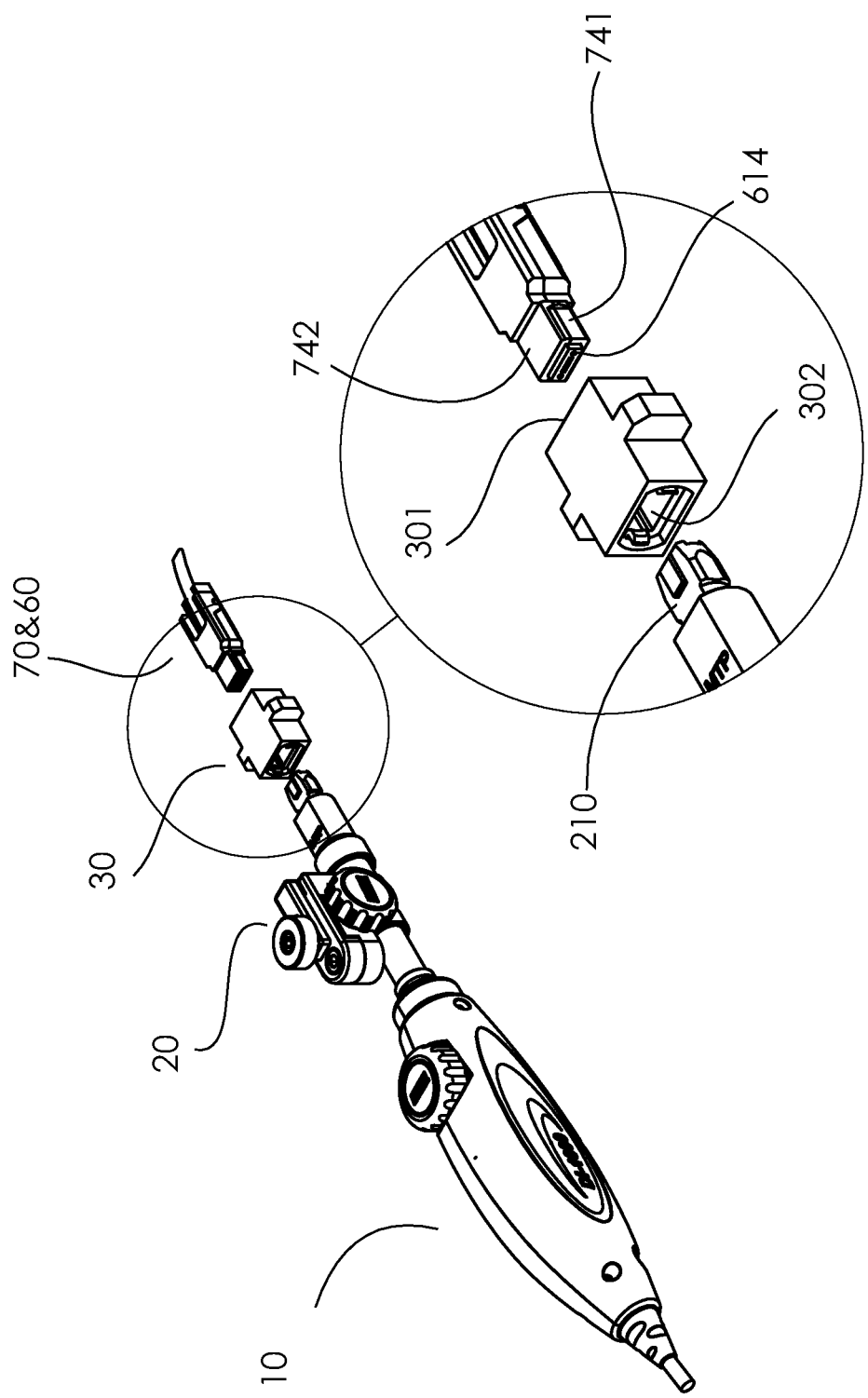
FIG. 11 shows the alignment of the MT ferrule adapter according to the present application (holding an MT ferrule assembly therein), an MPO connector adapter, and a microscope probe fitted with an MPO inspector tip, to illustrate how they can be connected together for inspecting the MT ferrule endface of an MT ferrule assembly.
Figure 12:
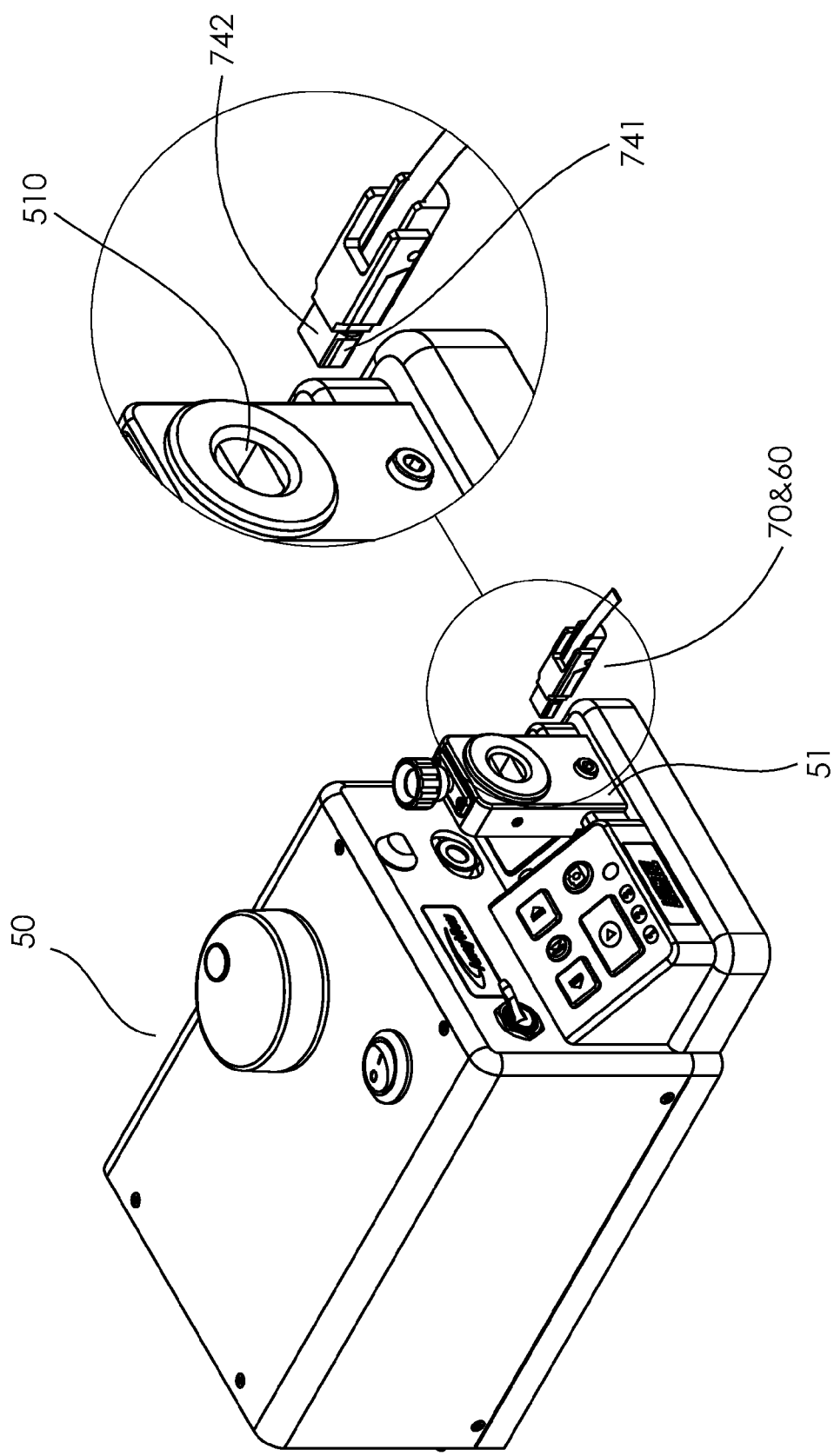
FIG. 12 shows the alignment of the MT ferrule adapter according to the present application (holding an MT ferrule assembly therein) with an automated inspection system to illustrate how they can be connected together for inspecting the MT ferrule endface of an MT ferrule assembly.

Two applications of the MT ferrule adapter 70 in adapting an MT ferrule assembly 60 into an MPO connector-type structure for endface inspection by MPO connector inspectors are illustrated in FIG. 11 and FIG. 12. FIG. 11 shows the alignment of the MT ferrule adapter 70 (holding an MT ferrule assembly 60 therein), an MPO connector adapter 30, and a microscope probe 10 fitted with an MPO inspector tip 20. Thus, the MT ferrule assembly 60 can be connected through the MT ferrule adapter 70 for endface inspection in the same way as is an MPO connector 40 by the microscope probe 10. Alternatively, FIG. 12 shows the alignment of the MT ferrule adapter 70 (holding an MT ferrule assembly 60 therein) with the MPO connector receptacle 510 of the automated inspection system 50 described above. Thus, the MT ferrule assembly 60 can be connected through the MT ferrule adapter 70 for endface inspection in the same way as is an MPO connector 40 by the automated inspection system 50.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An MT ferrule adapter for converting an MT ferrule assembly into an MPO connector-type structure for inspection, wherein the MT ferrule assembly includes an MT ferrule and a fiber array wrapped in a protective cover, the MT ferrule has a front portion and a rear portion, and the rear portion is wider and thicker than the front portion, the MT ferrule adapter comprising:

an upper jaw having a front portion and a rear portion;
a lower jaw having a front portion and a rear portion;
a shaft passing through the rear portion of the upper jaw and the rear portion of the lower jaw, such that the upper jaw and the lower jaw are rotatable relative to each other about the shaft between an open position, wherein the front portion of the upper jaw and the front portion of the lower jaw are spaced apart from each other, and a closed position, wherein the front portion of the upper jaw is adjacent or in contact with the front portion of the lower jaw,
wherein an elongated open channel is disposed on an upper side of the lower jaw, the open channel comprising a rear recess with an open rear end, a rectangular front recess with an open front end, and a rectangular middle recess between the front recess and the rear recess, the middle recess being wider and deeper than the front recess; and
an elongated open channel is disposed on a lower side of the upper jaw, the open channel comprising a rear recess with an open rear end, a front recess with an open front end, and a middle recess between the front recess and the rear recess;
wherein when the upper jaw and the lower jaw are in the open position, an opening is formed between the rear portion of the upper jaw and the rear portion of the lower jaw, the opening being sufficiently large for an MT ferrule assembly to pass through in order for a lower portion of the front portion of the MT ferrule of the MT ferrule assembly to be set in the front recess of the lower jaw, a lower portion of the rear portion of the MT ferrule of the MT ferrule assembly to be set in the middle recess of the lower jaw, with a front surface thereof protruding in front of the front recess of the lower jaw; and
when the upper jaw and the lower jaw are in the closed position, the front recess of the upper jaw and the front recess of the lower jaw together form a front locating space, the middle recess of the upper jaw and the middle recess of the lower jaw together form a middle locating space, and the rear recess of the upper jaw and the rear recess of the lower jaw together form a rear locating space, such that the front recess, the middle recess, or both of the upper jaw firmly press on a top surface of the MT ferrule of the MT ferrule assembly to fixedly hold the front portion of the MT ferrule in the front locating space and the rear portion of the MT ferrule in the middle locating space, with the front surface of the MT ferrule protruding in front of the front locating space.

2. The MT ferrule adapter as claimed in claim 1, wherein the front recess of the upper jaw is rectangular and of essentially the same width and length as the front recess of the lower jaw.

3. The MT ferrule adapter as claimed in claim 1, wherein the middle recess of the upper jaw is rectangular and of essentially the same width and length as the middle recess of the lower jaw.

4. The MT ferrule adapter as claimed in claim 2, wherein the middle recess of the upper jaw is rectangular and of essentially the same width and length as the middle recess of the lower jaw.

5. The MT ferrule adapter as claimed in claim 1, wherein the front recess of the lower jaw has a width the same as that of the front portion of the MT ferrule of the MT ferrule assembly, and the middle recess of the lower jaw has a width the same as that of the rear portion of the MT ferrule of the MT ferrule assembly.

6. The MT ferrule adapter as claimed in claim 5, wherein the middle recess of the lower jaw has a length the same as that of the rear portion of the MT ferrule of the MT ferrule assembly.

7. The MT ferrule adapter as claimed in claim 1, wherein a spring sheet is disposed in the open channel of the upper jaw for holding down the MT ferrule of the MT ferrule assembly when the upper jaw and the lower jaw are in the closed position.

8. The MT ferrule adapter as claimed in claim 1, wherein a front-facing surface is disposed on an outer perimeter of the upper jaw at a distance from a front end of the upper jaw, and a front-facing surface is disposed on an outer perimeter of the lower jaw at a distance from a front end of the lower jaw, whereby when the MT ferrule adapter in the closed position with an MT ferrule assembly fixedly held between the upper jaw and the lower jaw is inserted into an MPO connector adapter, the front-facing surface of the upper jaw and the front-facing surface of the lower jaw will stop at an end surface of the MPO connector adapter.

9. The MT ferrule adapter as claimed in claim 1, wherein a protrusion is formed on each of two lateral surfaces of the upper jaw at a distance from a front end of the upper jaw, and a protrusion is formed on each of two lateral surfaces of the lower jaw at a distance from a front end of the lower jaw, whereby when the MT ferrule adapter in the closed position with an MT ferrule assembly fixedly held between the upper jaw and the lower jaw is inserted into an MPO connector adapter, the protrusion of the upper jaw and the protrusion of the lower jaw on each side will together engage with a respective hook at an end surface of the MPO connector adapter.

10. The MT ferrule adapter as claimed in claim 1, further comprising a downward projecting strip along a middle part of a lower side of the front portion of the lower jaw, for serving as a polarity key for mating with an MPO connector adapter.

* * * * *